US010177950B2

(12) United States Patent
Floch et al.

(10) Patent No.: US 10,177,950 B2
(45) Date of Patent: Jan. 8, 2019

(54) RECEIVING SPREAD SPECTRUM SIGNALS

(71) Applicant: Airbus DS GmbH, Taufkirchen (DE)

(72) Inventors: Jean-Jacques Floch, Munich (DE);
Francis Soualle, Munich (DE)

(73) Assignee: AIRBUS DS GMBH, Taufkirchen (DE)

( * ) Notice: Subject to any disclaimer, the term of this patent is extended or adjusted under 35 U.S.C. 154(b) by 0 days.

(21) Appl. No.: 15/672,371

(22) Filed: Aug. 9, 2017

(65) Prior Publication Data
US 2018/0048502 A1    Feb. 15, 2018

(30) Foreign Application Priority Data

Aug. 11, 2016  (EP) ..................... 16183797

(51) Int. Cl.
*H04B 1/00* (2006.01)
*H04L 7/00* (2006.01)
(Continued)

(52) U.S. Cl.
CPC .......... *H04L 27/2278* (2013.01); *G01S 19/30* (2013.01); *H04B 1/692* (2013.01);
(Continued)

(58) Field of Classification Search
USPC ....... 375/130, 132, 134, 135, 136, 137, 140, 375/142, 141, 133, 144, 145, 146, 147, 375/149, 150, 152, 143, 219, 220, 221, 375/222, 240, 240.26, 240.28, 240.27, 375/259, 285, 284, 278, 293, 295, 316,
(Continued)

(56) References Cited

U.S. PATENT DOCUMENTS 5,663,733 A     9/1997 Lennen
7,099,949 B1 *  8/2006 Vanhoof ................ H04B 1/707
                                                375/E1.002
(Continued)

OTHER PUBLICATIONS

"Theory and Performance . . . ", Navigation: Journal of the Institute of Navigation, Vo. 39, No. 3, Fall 1992; Van D., Fenton, P. et al.
(Continued)

*Primary Examiner* — Linda Wong
(74) *Attorney, Agent, or Firm* — Greer, Burns & Crain, Ltd.

(57) ABSTRACT

A receiver for spread spectrum signals comprising a first part for preprocessing and digitizing a received signal, and a second part for tracking the digitized signal comprising a carrier loop and a code loop. The code loop comprises a generator for a reference receiver signal for correlation with the received signal and the code loop is configured to modify the reference signal to shape a correlation function between the received signal and the reference receiver signal. The first part is adapted to multiply the received spread spectrum signal with a first analog spectral offsetting signal provided for down-converting the received signal to an intermediate frequency and a sub-carrier frequency, selected from a set of sub-carrier frequencies, such that the received signal is down-converted and spectrally offset in the analog domain during a time interval covering at least one chip of a spreading code of the received signal.

17 Claims, 9 Drawing Sheets

(51) Int. Cl.
    *H04L 27/227*     (2006.01)
    *H04B 1/692*     (2011.01)
    *H04B 1/707*     (2011.01)
    *G01S 19/30*     (2010.01)
    *G01S 19/01*     (2010.01)
    *G06F 17/15*     (2006.01)
    *H04B 1/69*     (2011.01)
    *H04L 27/26*     (2006.01)

(52) U.S. Cl.
    CPC ............. *H04B 1/707* (2013.01); *G01S 19/01* (2013.01); *G06F 17/15* (2013.01); *H04B 2001/6904* (2013.01); *H04B 2001/6908* (2013.01); *H04B 2001/6912* (2013.01); *H04B 2001/70706* (2013.01); *H04L 27/2637* (2013.01)

(58) Field of Classification Search
    USPC ....... 375/340, 338, 346, 347, 350, 326, 324, 375/354, 362, 365, 366, 367, 368
    See application file for complete search history.

(56) References Cited

U.S. PATENT DOCUMENTS

| | | | | |
|---|---|---|---|---|
| 7,142,589 | B2* | 11/2006 | Valio | G01S 19/22 375/150 |
| 8,401,546 | B2* | 3/2013 | Landry, Jr. | G01S 19/24 342/357.2 |
| 2005/0114023 | A1* | 5/2005 | Williamson | G01C 21/165 701/472 |
| 2005/0175075 | A1* | 8/2005 | Martin | G01S 19/29 375/149 |
| 2005/0254560 | A1* | 11/2005 | Huang | G01S 19/30 375/150 |
| 2006/0022869 | A1 | 2/2006 | Zimmerman et al. | |
| 2006/0074558 | A1* | 4/2006 | Williamson | G01C 21/165 701/469 |
| 2009/0128403 | A1* | 5/2009 | Bryant | G01S 5/10 342/357.25 |
| 2010/0194635 | A1* | 8/2010 | An | G01S 19/24 375/147 |
| 2011/0261805 | A1* | 10/2011 | Landry, Jr. | G01S 19/24 370/342 |
| 2015/0236751 | A1* | 8/2015 | Floch | H04B 1/713 375/136 |
| 2015/0372714 | A1* | 12/2015 | Yu | G01S 19/24 375/142 |
| 2016/0116599 | A1* | 4/2016 | Turner | G01S 19/29 342/357.68 |
| 2017/0102465 | A1* | 4/2017 | Yu | G01S 19/29 |
| 2017/0139030 | A1* | 5/2017 | Bartone | G01S 1/042 |
| 2018/0011162 | A1* | 1/2018 | Bovard | G01S 5/06 |

OTHER PUBLICATIONS

"Modified High resolution . . . ", Journal of Navigation 2009, vol. 62, pp. 523-542; So H., Kim G. et al.

"GPS Multipath Mitigation . . . ", GPS World, Jun. 2013; Lawrence R.W.

European Search Report, dated Jan. 18, 2017, priority document.

* cited by examiner

RECEIVING SPREAD SPECTRUM SIGNALS

CROSS-REFERENCES TO RELATED APPLICATIONS

This application claims the benefit of the European patent application No. 16183797.6 filed on Aug. 11, 2016, the entire disclosures of which are incorporated herein by way of reference.

TECHNICAL FIELD

The invention relates to an improvement of receiving spread spectrum signals, particularly of BPSK (Binary Phase Shift Keying) signals of a GNSS (Global Navigation Satellite System).

BACKGROUND OF THE INVENTION

In the frame of GNSS signals, several systems use Direct Sequence Spread Spectrum (DSSS) and Binary Phase Shift Keying (BSPK) for modulating the signals. For instance BPSK modulation is used in the (NAVSTAR-) GPS (Global Positioning System) signals GPS L1-CA or GPS L5. BPSK has the advantage of being easily generated at the transmitter or receiver side. However, for a defined chip rate, a BPSK (modulated) signal is not as efficient in terms of code tracking performance and multipath robustness as other pulse shapes, for instance Binary Offset carrier (BOC) modulated signals. The main reason is that the pulse shapes of BOC modulated signals have a larger spectral bandwidth and are, therefore, more beneficial for tracking performances. In the signal terminology, this useful bandwidth is called the Gabor bandwidth, which is determined by the particular shape of the PSD (Power Spectral Density) function of the signal pulse shape.

New code discriminator techniques have been developed to improve the code tracking performances at receiver side of navigation signals using the BPSK pulse shape. As an example, two of these techniques are described in the publications "Theory and Performance of Narrow Correlator Spacing in a GPS Receiver," Van D., Fenton, P., et al., Navigation: Journal of the Institute of Navigation, Vol. 39, No. 3, Fall 1992, and "Modified High Resolution Correlator Technique for Short-delayed Multipath Mitigation," So H., Kim G., et al., Journal of Navigation 2009, Vol. 62, pp. 523-542.

Another way to improve code tracking in multipath environments at receiver side is shown in the publication "GPS Multipath Mitigation: How Good Can It Get with New Signals?," Lawrence R. W., GPS World, June 2003, which describes an implementation of a multipath mitigation algorithm based on the statistical theory of maximum likelihood.

However, most of these techniques do not improve efficiently simultaneously the code tracking performance in a noisy environment and in a multipath environment, for a given transmitted signal pulse shape, like a BPSK.

SUMMARY OF THE INVENTION

It is an object of the present invention to improve the receiving performances of spread spectrum signals, particularly in a noisy environment and in a multipath environment.

The invention proposes a modified architecture of a receiver and a novel method for receiving spread spectrum signals in order to improve the code tracking performance in a noisy environment and in a multipath environment. Particularly, the invention can be applied to BPSK (modulated) signals in order to get as good code performance with a received BPSK signal as with a BOC received signal, in terms of code tracking and multipath robustness. However, the present invention is not restricted to an application with BPSK signals, but can be applied to any pulse shape type of spread spectrum signals. The principle underlying the present invention comprises improving the received correlation function of any signal pulse shape on the receiver side, particularly in a receiver. The invention proposes to modify the receiver side front-end signal processing and the generation of the correlator reference waveform to obtain a modified CF (Correlation Function), optimized for code tracking and multipath robustness. The term "spread spectrum signal" as used herein means a signal with a particular bandwidth, which is spread in the frequency domain by means of a spreading code, particularly a Pseudo-Random Noise (PRN) code, so that the spread spectrum signal has a wider bandwidth than the original signal before the act of spreading. Particularly, the spread spectrum signal can be a BPSK signal, which can be generated by an exclusive-or operation of a PRN code and data to be transmitted by the signal such as the GPS L1-CA or GPS L5 signals. Here the BPSK or BOC pulse shape represents the modulation applied to the shape materializing each code, also called chip for navigation signals. It has to be noted that the proposed invention does not apply only to DSSS signals spread with periodical codes, such as the GPS L1-CA or GPS L5 signals, which justifies the use of the term Pseudo in the expression Pseudo-Random Noise code, but also to non-periodical codes or codes having a very long periodicity, such like the GPS L1-P signals, when compared to the orders of magnitude for the typical time constants and integration times, usually expressed in milliseconds or seconds, used in the receiver tracking loops.

An embodiment of the invention relates to a receiver for spread spectrum signals comprising a first part for preprocessing and digitizing a received spread spectrum signal, and a second part for tracking the digitized received spread spectrum signal and comprising a carrier loop and a code loop, wherein the code loop comprises a generator for a reference receiver signal for correlation with the received spread spectrum signal and the code loop is configured to modify the reference receiver signal in order to shape a correlation function between the received spread spectrum signal and the reference receiver signal. By shaping of the correlation function, the receiver can be adapted to the received spread spectrum signal. The first part is adapted for multiplying the received spread spectrum signal with a first analog spectral offsetting signal provided for down-converting the received spread spectrum signal to an intermediate frequency $IF_0$ and a sub-carrier frequency $f_m$ selected from a set of M sub-carrier frequencies such that the received spread spectrum signal is down-converted and spectrally offset in the analog domain during a time interval covering $L_m$ chips, wherein $L_m$ chips comprises at least one chip of a spreading code of the received spread spectrum signal, or the first part is adapted for multiplying the received spread spectrum signal with a second analog spectral offsetting signal provided for down-converting the received spread spectrum signal to an intermediate frequency IF0 in the analog domain, for digitizing the down-converted received spread-spectrum signal, and for multiplying the digitized and down-converted received spread spectrum signal with a digital spectral offsetting signal provided for spectrally offsetting the digitized and down-converted received spread spectrum signal in the digital domain to a sub-carrier frequency $f_m$ selected from a set of M sub-carrier frequencies such that the digitized and down-converted received spread spectrum signal is spectrally offset in the digital domain during a time interval covering $L_m$ chips, wherein $L_m$ chips comprises at least one chip of a spreading code of the received spread spectrum signal.

Several spectral offsettings in the analog domain or in the digital domain may be performed with different sub-carrier frequencies fm. For example, spectral offsettings with two different sub-carrier frequencies may be performed alternatingly time intervals covering at least one chip of the spreading code of the received spread spectrum signal. In case of a periodic spreading code, the spectral offsettings with two or more different sub-carrier frequencies may also alternate from code period to code period. Furthermore, the time interval covering $L_m$ chips may vary from cycle to cycle of a frequency offsetting cycle C covering M sub-carrier frequencies $\{f_m\}_{1 \leq m \leq M, C}$.

The first analog spectral offsetting signal may be defined by $e^{j(2\pi(f_{RF}+IF_0+f_m)(t-\tau_{est,prec})+\varphi_m)}$, and the second analog spectral offsetting signal may be defined by $e^{j(2\pi(f_{RF}+IF_0)(t-\tau_{est,prec}))}$ and the digital spectral offsetting signal may be defined by $e^{j(2\pi(f_m)(t-\tau_{est,prec})+\varphi_m)}$ with t being a time variable, $f_m$ being a sub-carrier frequency selected from the set of M sub-carrier frequencies and applied during a time interval covering $L_m$ chips, $\tau_{est,prec}$ being a time offset, which is used for synchronization and depends on the actual propagation delay ti of the transmitted signal up to the receiver and is estimated in a $\tau_{est,prec}$ generator from at least one of the past outputs of the code loop and/or the carrier loop of the receiver, and/or is estimated by an external estimator of the propagation delay to the receiver and processed by the $\tau_{est,prec}$ generator, and $\varphi$m being a phase which ensures that the argument of the exponential term is continuous at a transition between two consecutive time intervals corresponding to two sub-carrier frequencies $f_m$ and $f_{m+1}$. Processing of the time offset $\tau_{est,prec}$ by the $\tau_{est,prec}$ generator can for example comprise a passing through of the time offset τest,prec received from the external estimator or a data fusing of the received time offset $\tau_{est,prec}$ with a time offset $\tau_{est,prec}$ estimated in the $\tau_{est,prec}$ generator from at least one of the past outputs $\tau_{est,cur}, \varphi_{est,cur}$ of the code loop and/or the carrier loop of the receiver. Particularly, data fusing may comprise making the time offset $\tau_{est,prec}$ estimated in the $\tau_{est,prec}$ generator plausible by means of the received time offset $\tau_{est,prec}$.

The first part may comprise a local oscillator, an analog digital converter and either a frequency generator configured for synthesizing frequency references for the local oscillator for down-converting the received spread spectrum signal to the intermediate frequency $IF_0$ and the sub-carrier frequency $f_m$ and for the analog digital converter for digitizing the down-converted received spread spectrum signal, or a frequency generator configured for synthesizing frequency references for the local oscillator for down-converting the received spread spectrum signal to the intermediate frequency $IF_0$ and for the analog digital converter for digitizing the down-converted received spread spectrum signal and an additional digital local oscillator to spectrally offset the down-converted digital spread spectrum signal to the sub-carrier frequency $f_m$.

The first part may further comprise a pre-processing unit for pre-processing the down-converted received spread spectrum signal before digitizing, wherein the pre-processing unit comprises filtering and an automatic gain control of the down-converted spread spectrum signal.

The code loop may comprise a multiplier to modify the reference receiver signal by multiplying the reference receiver signal with a second digital spectral offsetting signal $e^{-j(2\pi(f_m+IF_0)(t-\tau_{est,cur})+\varphi_m)}$ with $f_m$ being a sub-carrier frequency among a set of M sub-carrier frequencies and applied during a time interval covering $L_m$ chips, t being the time variable, $\tau_{est,cur}$ being a current estimate of the propagation delay τ, which is used for synchronization by applying $\tau_{est,cur}$ to the reference signal as a replica, which will multiply the received spread spectrum signal in the correlation block, and which is provided by the code loop and/or carrier loop and/or by an external estimator of the propagation delay to the receiver, and φm being a phase which ensures that the argument of the exponential term is continuous at a transition between two consecutive time intervals corresponding to two sub-carrier frequencies $f_m$ and fm+1, so that the correlation function between the received spread spectrum signal and the reference receiver signal is modulated by the modulation term $$\left( \sum_{m=1}^{M} \frac{L_m}{P} e^{j2\pi f_m \Delta^* \tau} \right)$$

with M being the number of sub-carrier frequencies $f_m$ applied during a duration covering P chips of the spreading code $$P = \sum_{m=1}^{M} L_m,$$

and $\Delta^* t$ being equal to $(\tau_{est,prec} - \tau_{est,cur})$, with $\tau_{est,prec}$ being a time offset, which is used for synchronization and depends on the actual propagation delay τ of the transmitted signal up to the receiver and is estimated in a $\tau_{est,prec}$ generator from at least one of the past outputs of the code loop and/or the carrier loop of the receiver, and/or is estimated by an external estimator of the propagation delay to the receiver and processed by the $\tau_{est,prec}$ generator.

P being expressed in chips may be defined as the duration of a frequency offsetting cycle C covering M sub-carrier frequencies $\{f_m\}_{1 \leq m \leq M, C}$. Furthermore, a set $\{L_m\}_{1 \leq m \leq M, C}$ of time intervals being expressed in chips and during which the sub-carrier frequencies $f_m$ are applied can be selected such that it is different for successive frequency offsetting cycles, but still fulfils the relationship $$P = \sum_{m=1}^{M} L_m$$

for each cycle. For example, for each sub-carrier frequency $f_m$ the corresponding duration $L_m$ in a cycle C1 can differ with respect to the duration $L_m$ in a cycle $C_2$, and therefore the elements of the set $\{L_m\}_{1 \leq m \leq M, C1}$ can be different with respect to the elements of the set $\{L_m\}_{1 \leq m \leq M, C2}$. In the case that the spreading code is a periodic code with period L, the period covering P chips of the spreading code may be equal to the spreading code period $$P = \sum_{m=1}^{M} L_m = L.$$

Here again the set $\{L_m\}_{1 \le m \le M, C}$ of time intervals can differ over different spreading code periods.

The receiver may be configured to receive as a spread spectrum signal a Binary-Phase-Shift-Keying—BPSK(N)—modulated spread spectrum signal (particularly corresponding to a N Mega Chip/s chipping rate) such that the combination of the reference receiver signal multiplied with the offsetting signal can be replaced with a BOC(K,N) reference receiver signal if the set of M frequencies contains only 2 frequencies $+f_K$ and $-f_K$ with $f_k$ equal K MHz and the duration of the time intervals when $+f_k$ is applied is identical to the duration of the time intervals when $-f_k$ is applied.

A further embodiment of the invention relates to a device for positioning using spread spectrum signals transmitted by a Global Navigation Satellite System, the device comprising a receiver of the invention and as disclosed herein for receiving the spread spectrum signals.

A yet further embodiment of the invention relates to a method for receiving spread spectrum signals comprising the following steps: preprocessing and digitizing a received spread spectrum signal, tracking the digitized received spread spectrum signal by means of a carrier loop and a code loop, wherein the tracking comprises generating a reference receiver signal for correlation with the received spread spectrum signal in the code loop and shaping a correlation function between the received spread spectrum signal and the reference receiver signal by modifying the reference receiver signal in the code loop, wherein the received spread spectrum signal is multiplied with a first analog spectral offsetting signal provided for down-converting the received spread spectrum signal to an intermediate frequency $IF_0$ and a sub-carrier frequency $f_m$ selected from a set of M sub-carrier frequencies such that the received spread spectrum signal is down-converted and spectrally offset in the analog domain during a time interval covering $L_m$ chips, wherein $L_m$ chips comprises at least one chip of a spreading code of the received spread spectrum signal, or the received spread spectrum signal is multiplied with a second analog spectral offsetting signal provided for down-converting the received spread spectrum signal to an intermediate frequency $IF_0$ in the analog domain, for digitizing the down-converted received spread-spectrum signal, and for multiplying the digitized and down-converted received spread spectrum signal with a digital spectral offsetting signal provided for spectrally offsetting the digitized and down-converted received spread spectrum signal in the digital domain to a sub-carrier frequency $f_m$ selected from a set of M sub-carrier frequencies such that the digitized and down-converted received spread spectrum signal is spectrally offset in the digital domain during a time interval covering $L_m$ chips, wherein $L_m$ chips comprises at least one chip of a spreading code of the received spread spectrum signal.

Several spectral offsettings in the analog domain or in the digital domain may be performed with different sub-carrier frequencies, $f_m$, and/or the time interval covering $L_m$ chips may vary from cycle to cycle of a frequency offsetting cycle C covering M sub-carrier frequencies $\{f_m\}_{1 \le m \le M, C}$.

The first analog spectral offsetting signal may be defined by $e^{j(2\pi(f_{RF}+IF_0+f_m)(t-\tau_{est,prec})+\varphi_m)}$, and the second analog spectral offsetting signal may defined by $e^{j(2\pi(f_{RF}+IF_0)(t-\tau_{est,prec}))}$ and the digital spectral offsetting signal may be defined by $e^{j(2\pi(f_m)(t-\tau_{est,prec})+\varphi_m)}$ with t being a time variable, $f_m$ being a sub-carrier frequency selected from the set of M sub-carrier frequencies and applied during a time interval covering $L_m$ chips, $\tau_{est,prec}$ being a time offset, which is used for synchronization and depends on the actual propagation delay $\tau$ of the transmitted signal up to the receiver and is estimated in a $\tau_{est,prec}$ generator from at least one of the past outputs of the code loop and/or the carrier loop of the receiver, and/or is estimated by an external estimator of the propagation delay to the receiver and processed by the $\tau_{est,prec}$ generator, and $\varphi m$ being a phase which ensures that the argument of the exponential term is continuous at a transition between two consecutive time intervals corresponding to two sub-carrier frequencies $f_m$ and $f_{m+1}$. Processing of the time offset $\tau_{est,prec}$ by the $\tau_{est,prec}$ generator can for example comprise a passing through of the time offset $\tau_{est,prec}$ received from the external estimator or a data fusing of the received time offset $\tau_{est,prec}$ with a time offset $\tau_{est,prec}$ estimated in the $\tau_{est,prec}$ generator from at least one of the past outputs $\tau_{est,cur}$, $\varphi_{est,cur}$ of the code loop and/or the carrier loop of the receiver. Particularly, data fusing may comprise making the time offset $\tau_{est,prec}$ estimated in the $\tau_{est,prec}$ generator plausible by means of the received time offset $\tau_{est,prec}$.

The steps of down-converting and digitizing of the received spread spectrum signal may comprise either the synthesizing of frequency references for down-converting the received spread spectrum signal to the intermediate frequency $IF_0$ and the sub-carrier frequency $f_m$ and for digitizing the down-converted received spread spectrum signal, or the synthesizing of frequency references for down-converting the received spread spectrum signal to the intermediate frequency $IF_0$ and for digitizing the down-converted received spread spectrum signal and for spectrally offsetting the down-converted digital spread spectrum signal to the sub-carrier frequency $f_m$.

The step of preprocessing may comprise filtering and an automatic gain control of the down-converted spread spectrum signal.

The step of modifying the reference receiver signal in the code loop may comprise multiplying the reference receiver signal with a second digital spectral offsetting signal $e^{-j(2\pi(f_m+IF_0)(t-\tau_{est,cur})+\varphi_m)}$ with $f_m$ being a sub-carrier frequency selected from the set of M sub-carrier frequencies and applied during a time interval covering $L_m$ chips, t being a time variable, $\tau_{est,cur}$ being a current estimate of the propagation delay $\tau$, which is used for synchronization by applying $\tau_{est,cur}$ to the reference signal as a replica, which will multiply the received spread spectrum signal in the correlation block, and which is provided by the code loop and/or carrier loop and/or by an external estimator of the propagation delay to the receiver, and $\varphi m$ being a phase which ensures that the argument of the exponential term is continuous at a transition between two consecutive time intervals corresponding to two sub-carrier frequencies $f_m$ and $f_{m+1}$, so that the correlation function between the received spread spectrum signal and the reference receiver signal is modulated by the modulation term $$\left( \sum_{m=1}^{M} \frac{L_m}{P} e^{j2\pi f_m \Delta^* \tau} \right)$$

with M being the number of sub-carrier frequencies $f_m$ applied during a duration covering P chips of the spreading code $$P = \sum_{m=1}^{M} L_m,$$

and Δ*T being equal to $(\tau_{est,prec} - \tau_{est,cur})$, with $\tau_{est,prec}$ being a time offset, which is used for synchronization and depends on the actual propagation delay τ of the transmitted signal up to the receiver and is estimated in a $\tau_{est,prec}$ generator from at least one of the past outputs of the code loop and/or the carrier loop of the receiver, and/or is estimated by an external estimator of the propagation delay to the receiver and processed by the $\tau_{est,prec}$ generator.

P being expressed in chips may be defined as the duration of a frequency offsetting cycle C covering M sub-carrier frequencies $\{f_m\}_{1\leq m\leq M,C}$. Furthermore, the set $\{L_m\}_{1\leq m\leq M,C}$ of time intervals being expressed in chips and during which the sub-carrier frequencies $f_m$ are applied may be selected such that it is different for successive frequency offsetting cycles, but still fulfils the relationship $$P = \sum_{m=1}^{M} L_m$$

for each cycle. For example, for each sub-carrier frequency $f_m$ the corresponding duration $L_m$ in a cycle $C_1$ can differ with respect to the duration $L_m$ in a cycle $C_2$, and therefore the elements of the set $\{L_m\}_{1\leq m\leq M,C_1}$ can be different with respect to the elements of the set $\{L_m\}_{1\leq m\leq M,C_2}$. In the case that the spreading code is a periodic code with period L, the period covering P chips of the spreading code may be equal to the spreading code period $$P = \sum_{m=1}^{M} L_m = L.$$

Here again the set $\{L_m\}_{1\leq m\leq M,C}$ of time intervals can differ over different spreading code periods.

The method may be characterized in that as spread spectrum signal a signal with any pulse shape type and particularly a Binary-Phase-Shift-Keying—BPSK(N)— modulated spread spectrum signal (particularly corresponding to a N Mega Chip/s chipping rate) such that the combination of the reference receiver signal multiplied with the offsetting signal can be replaced with a BOC(K,N) reference receiver signal if the set of M frequencies contains only 2 frequencies +fK and −fK with fk equal K MHz and the duration of the time intervals when +fk is applied is identical to the duration of the time intervals when −fk is applied, can be received.

A further embodiment of the invention relates to a computer program, which implements the method for receiving spread spectrum signals according to the invention and as described herein and enables the receiving of spread spectrum signals according to the invention when executed by a computer, which is equipped with means for receiving spread spectrum signals such as an antenna and a RF (Radio Frequency) front end. The computer program is stored on a non-transitory computer-readable medium, comprising instructions for the implementation, by a processor of the communication device having the means for receiving spread spectrum signals such as an antenna and a RF (Radio Frequency) front end.

According to a further embodiment of the invention, a record carrier storing a computer program according to the invention may be provided, for example a CD-ROM, a DVD, a memory card, a diskette, or a similar data carrier suitable to store the computer program for electronic access, the record carrier comprising a non-transitory storage device having stored thereon computer-executable instructions for the implementation, by the processor of the communication device, of the method described above, when the program is executed by the processor.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF THE PREFERRED EMBODIMENTS

Figure 1:
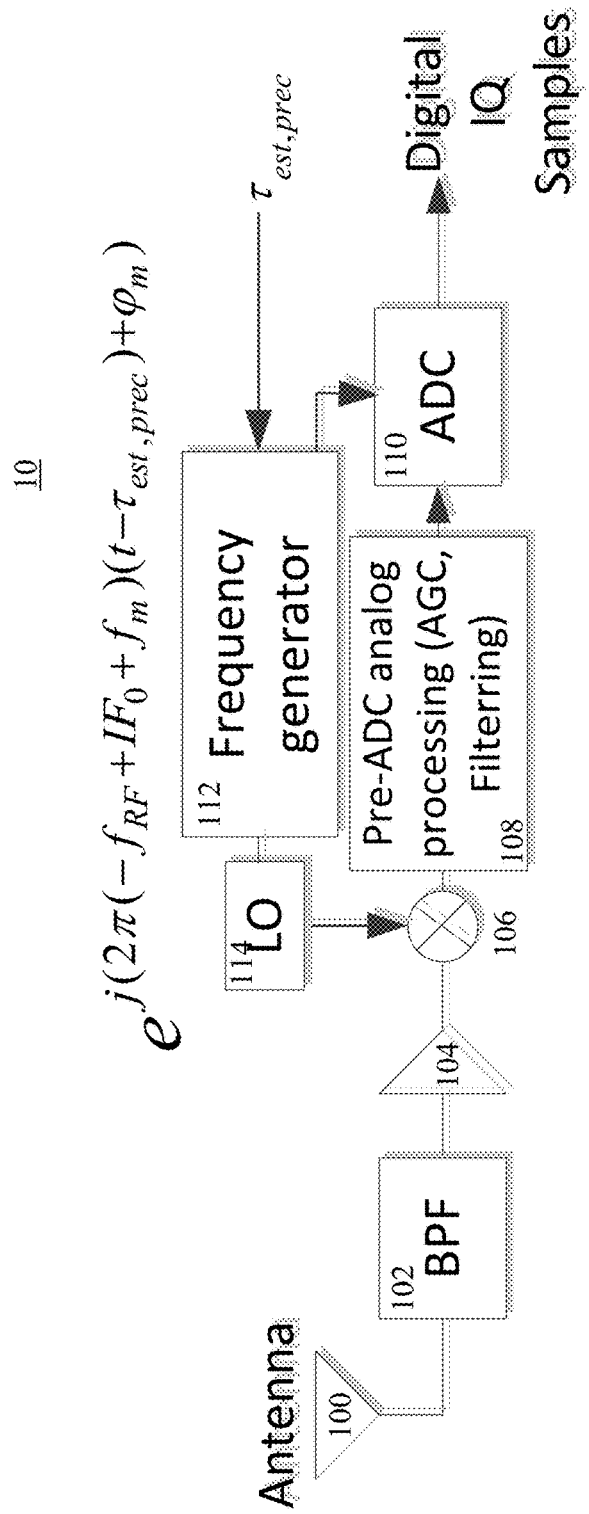
FIG. 1 shows a first embodiment of a first part of the receiver architecture according to the invention comprising a multiplication with the sub-carrier $f_m$, in the analog domain.

In the following, functionally similar or identical elements may have the same reference numerals. Absolute values are shown below by way of example only and should not be construed as limiting the invention.

In FIG. 1, an embodiment of the inventive architecture applying a multiplication of the sub-carrier frequency in the analog domain (in an analog part of the receiver front-end) is considered for illustration. The mathematical derivations and the advantages in terms of robustness against noise and multipath would be similar when applying the multiplication of the sub-carrier frequency in the digital domain (as illustrated by the embodiment of the inventive architecture shown in FIG. 2).

FIG. 1 shows a first, analog part 10 of the inventive receiver architecture for receiving spread spectrum signals transmitted by a GNSS, particularly by GNSS satellites. A GNSS (spread spectrum) signal is received through an antenna 100 and then filtered through a Band Pass Filter (BPF) at RF to reduce the effects of potential out-of-band interferers and to preserve thus the Low-Noise Amplifier (LNA) or other components of the receiver front-end 102. The signal is then amplified by a Low Noise Amplifier (LNA) with a minimal degradation of the receiver noise FIG. 104 to compensate for transmission A frequency generator 112 synthesizes a frequency reference for all the front end components and allows down-converting the signal at Radio Frequency ($f_{RF}$) to an Intermediate Frequency ($IF_0$) plus a sub-carrier frequency ($f_m$) by means of a Local Oscillator (LO) 114. The multiplication with the first analog spectral offsetting signal $e^{j(2\pi(f_{RF}+IF_0+f_m)(t-\tau_{est,prec})+\varphi_m)}$ ensures the additional spectral offset, $f_m$, of the down-converted signal and constitutes the first part and condition of the proposed invention. In the argument of the exponential expression, t is the time variable, $f_m$ is a sub-carrier frequency among a set of M sub-carriers and applied during a time interval covering $L_m$ chips, wherein $L_m$ chips comprises at least one chip of a spreading code of the received spread spectrum signal, $\tau_{est,prec}$ is a time offset, used for synchronization, which is function of the actual propagation delay, $\tau$, of the transmitted signal up to the receiver, and which is estimated from the past outputs of the Code and Carrier loops embedded in the receiver, or by an external estimator of the propagation delay to the receiver, and φm is a phase which ensures that the argument of the exponential term is continuous at the transition between two consecutive sub-carrier phase $f_m$ and $f_{m+1}$. In the exemplary embodiment, one considers that M spectral offsettings are applied successively over a period covering P chips such that $$P = \sum_{m=1}^{M} L_m.$$

Furthermore in the same exemplary embodiment, one considers that the spreading code is periodical with L chips, and that the duration covering the M spectral offsettings covers one spreading code period such that P=L. Finally in the same exemplary embodiment, one considers the special case where each sub-carrier frequency $f_m$ is applied over a duration covering a fraction of (1/M) of the spreading code period duration, which means that M is a divider of L, and that the number of chips $L_m$ is identical for all frequencies fm. In this exemplary embodiment, it means that the time intervals $L_m$ are identical to (L/M) chips for all sub-carrier frequencies and that the set $\{L_m\}_{1 \le m \le M}$ contains M times the same value (L/M) for different frequency offsetting cycles. The LO output signal is multiplied with the band-filtered and amplified received GNSS signal for down-conversion to the Intermediate Frequency $IF_0$ plus the sub-carrier frequency fm. The Intermediate Frequency $IF_0$ can be zero; in that case the signal is down-converted directly to the sub-carrier frequency $f_m$.

The sub-carrier frequency ($f_m(t)$) takes different values among a set of M $f_m$ values during a period covering P chips which is equal to the spreading code period, L, of the GNSS signal, and depends consequently on time (for simplification, in the following mathematical description the time dependency of $f_m$ is not mentioned any more). The down-converted GNSS signal is then pre-processed before digitizing with an Analog-to-Digital Converter (ADC) 110. This signal pre-processing is performed by a pre-processing in 108, which can include filtering and an Automatic Gain Control (AGC), where the role of the filtering is to attenuate potential interfering signals appearing within the bandwidth of the first BPF and the role of the AGC is to guarantees that the amplitude of received signal is adapted to the dynamic of an Analog-to-Digital Converter (ADC) in block 110 to minimize the quantization losses. The analog down-converted and pre-processed GNSS signal is then digitized through the ADC 110, which outputs digital IQ (In-Phase and Quadrature) samples of the GNSS signal for processing by a digital part of the inventive receiver architecture.

Figure 2:
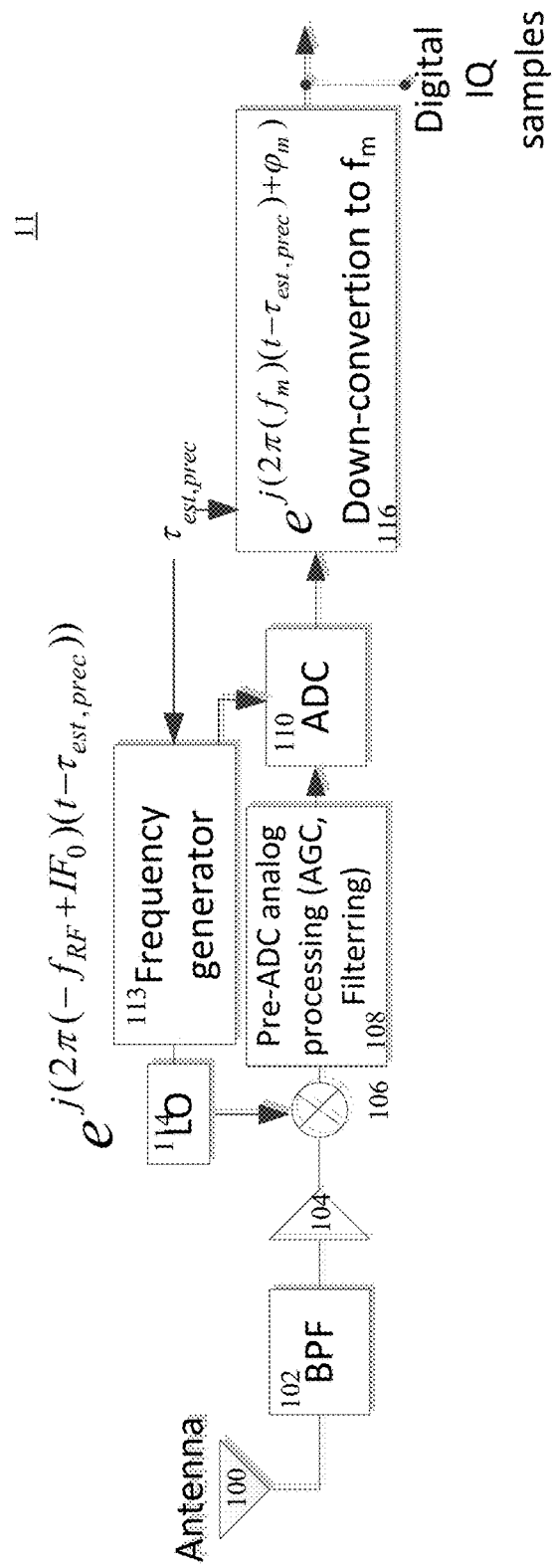
FIG. 2 shows a second embodiment of a first part of the receiver architecture according to the invention comprising a multiplication with the sub-carrier $f_m$, in the digital domain.

FIG. 2 shows a mixed analog/digital implementation of the first part 11 of the inventive receiver architecture for receiving spread spectrum signals transmitted by a GNSS, where the multiplication of the sub-carrier frequency is applied in the digital domain, i.e., after down-conversion and digitizing of a received GNSS signal. In this implementation, a frequency generator 113 synthesizes a frequency reference for all the front end components and allows down-converting the signal at Radio Frequency ($f_{RF}$) to an Intermediate Frequency ($IF_0$) by means of a Local Oscillator (LO) 114. The multiplication with the second analog spectral offsetting signal $e^{j(2\pi(-f_{RF}+IF_0)(t-\tau_{est,prec}))}$ ensures the down-conversion of the signal. In the argument of the exponential expression, t is the time variable, $\tau_{est,prec}$ is a time offset, used for synchronization, which is function of the actual propagation delay, $\tau$, of the transmitted signal up to the receiver, and which is estimated from the past outputs of the Code and Carrier loops embedded in the receiver, or by an external estimator of the propagation delay to the receiver. The LO output signal is multiplied with the band-filtered and amplified received GNSS signal for down-conversion to the Intermediate Frequency $IF_0$.

The down-converted GNSS signal is then pre-processed before digitizing with an Analog Digital Converter (ADC) 110. This signal pre-processing is performed by a pre-processing in 108, which can include filtering and an Automatic Gain Control (AGC), where the role of the filtering is to attenuate potential interfering signals appearing within the bandwidth of the first BPF and the role of the AGC is to guarantees that the amplitude of received signal is adapted to the dynamic of an Analog-to-Digital Converter (ADC) in block 110 to minimize the quantization losses. The analog down-converted and pre-processed GNSS signal is then digitized through the ADC 110, and the digitized and down-converted received spread spectrum signal is then in block 116 multiplied with a digital spectral offsetting signal $e^{j(2\pi(f_m)(t-\tau_{est,prec})+\varphi_m)}$ for spectrally offsetting the digitized and down-converted received spread spectrum signal in the digital domain to a sub-carrier frequency $f_m$ selected from a set of M sub-carrier frequencies such that the digitized and down-converted received spread spectrum signal is spectrally offset in the digital domain during a time interval covering $L_m$ chips. In the argument of the exponential expression, t is the time variable, $\tau_{est,prec}$ is a time offset, used for synchronization, which is function of the actual propagation delay, $\tau$, of the transmitted signal up to the receiver, and which is estimated from the past outputs of the Code and Carrier loops embedded in the receiver, or by an external estimator of the propagation delay to the receiver, and φm is a phase which ensures that the argument of the exponential term is continuous at the transition between two consecutive sub-carrier phase $f_m$ and $f_{m+1}$. In the exemplary embodiment, one considers that M spectral offsettings are applied successively over a period covering P chips such that $$P = \sum_{m=1}^{M} L_m.$$

Furthermore in the same exemplary embodiment, one considers that the spreading code is periodical with L chips, and that the duration covering the M spectral offsettings covers one spreading code period such that P=L. Finally in the same exemplary embodiment, one considers the special case where each sub-carrier frequency $f_m$ is applied over a duration covering a fraction of (1/M) of the spreading code period duration, which means that M is a divider of L, and that the number of chips $L_m$ is identical for all frequencies fm. In this exemplary embodiment, it means that the time interval $L_m$ is identical to (L/M) chips for all sub-carrier frequencies and that the set $\{L_m\}_{1 \le m \le M}$ contains M times the same value (L/M) for the different frequency offsetting cycles. Block 116 finally outputs digital IQ (In-Phase and Quadrature) samples of the GNSS signal for processing by a digital part of the inventive receiver architecture.

Figure 3:
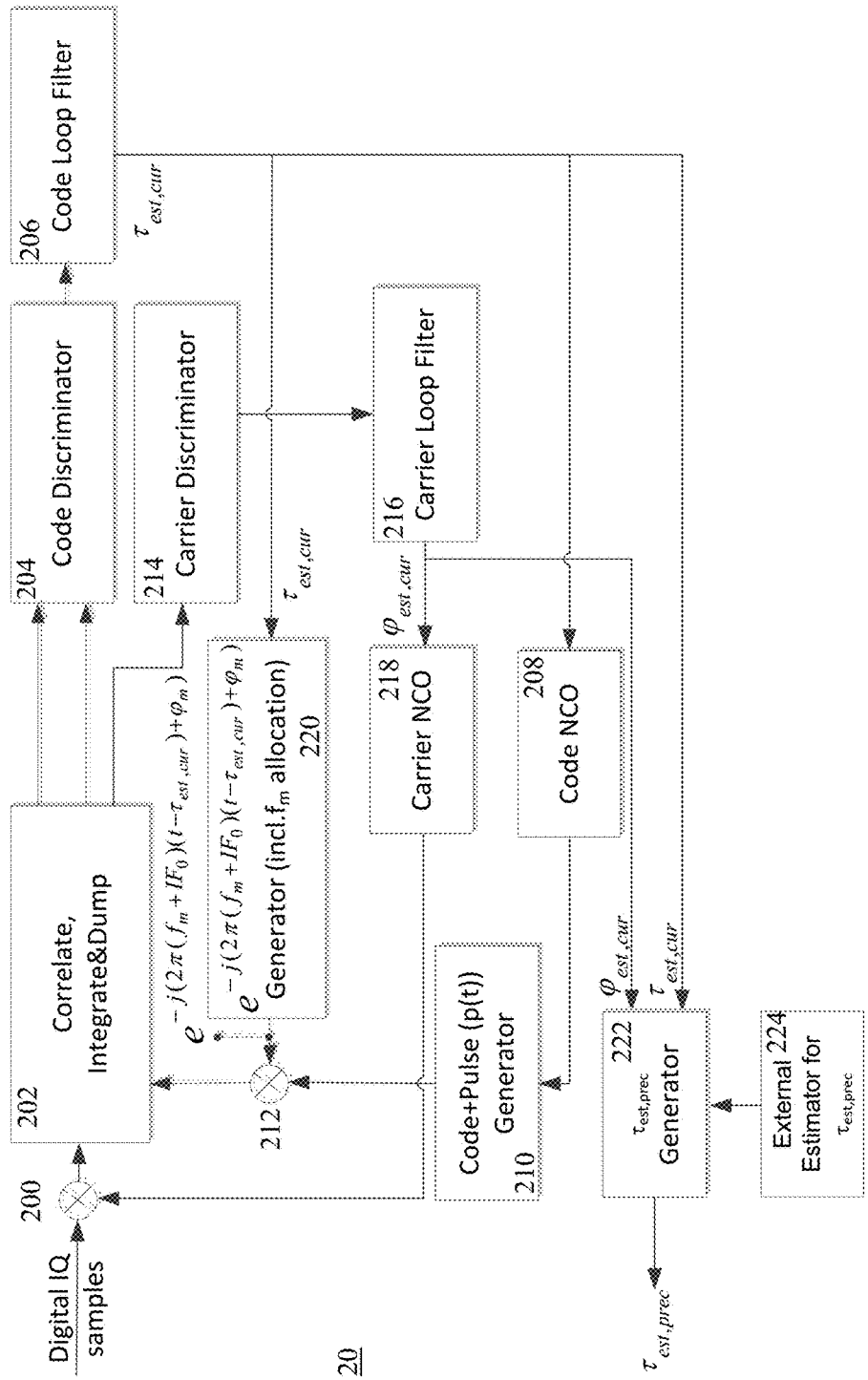
FIG. 3 shows an embodiment of a second part of the receiver architecture according to the invention which can be applied with the embodiments of FIG. 1 or FIG. 2.

The second digital part 20 of the inventive receiver architecture is shown in FIG. 3. The digitized IQ samples are transmitted from the first part (10 for the analog option, or 11 for the digital option), to the digital part 20 of the (tracking) receiver. The digital part 20 includes a code loop and a carrier loop. Both loops comprise a correlate, integrate & dump unit 202. The code loop additionally comprises a code discriminator 204, a code loop filter 206, a code numerical controlled oscillator (NCO) 208, a code and pulse generator 210 for generating a reference receiver signal, and a multiplier 212 for multiplying the reference receiver signal by $e^{-j(2\pi(f_m+IF_0)(t-\tau_{est,cur})+\varphi_m)}$ as will be described below in more detail. The carrier loop additionally comprises a carrier discriminator 214, a carrier loop filter 216, a carrier NCO 218, and a multiplier 200 for multiplying the input signal (digitized IQ samples) with the carrier frequency output by the carrier NCO 218.

The input signal Doppler frequency and phase are compensated by the carrier loop. The synchronization between the input signal and the receiver reference signal is done via the code loop.

The second part of the invention, taking place in the digital part of the tracking receiver is that the reference receiver signal is multiplied by a second digital spectral offsetting signal $e^{-j(2\pi(f_m+IF_0)(t-\tau_{est,cur})+\varphi_m)}$ with $f_m$ being a sub-carrier frequency among a set of M sub-carrier frequencies and applied during a time interval covering $L_m$ chips, t being the time variable, $\tau_{est,cur}$ being the current estimate of the propagation delay $\tau$, used for synchronization, and provided by the code loop or by an external estimator of the propagation delay to the receiver. The second digital spectral offsetting signal is generated by generator 220.

The digital part 20 shown in FIG. 3 further comprises a $\tau_{est,prec}$ generator 222 for generating the time offset $\tau_{est,prec}$ used for synchronization in the analog or digital spectral offsetting performed in the receiver front-end, using as input the current estimate $\tau_{est,cur}$ of the code phase due to propagation delay and/or a current estimate $\varphi_{est,cur}$ of the carrier phase due to the propagation delay, and/or an (optional) external estimator 224 for the time offset $\tau_{est,prec}$ used for synchronization. The $\tau_{est,prec}$ generator 222 for generating the time offset $\tau_{est,prec}$ may either estimate the time offset $\tau_{est,prec}$ by processing the inputted current estimate $\tau_{est,cur}$ of the code phase due to propagation delay and/or the inputted current estimate $\varphi_{est,cur}$ of the carrier phase due to the propagation delay, or receive a time offset $\tau_{est,prec}$ estimated by the external estimator 224 and process this received estimation of the time offset $\tau_{est,prec}$, for example by passing through received estimation of the time offset $\tau_{est,prec}$ to its output, or by data fusing of the received time offset $\tau_{est,prec}$ with its own estimated time offset $\tau_{est,prec}$, i.e. the time offset $\tau_{est,prec}$ estimated in the $\tau_{est,prec}$ generator 222 from the inputted current estimate $\tau_{est,cur}$ of the code phase due to propagation delay and/or the inputted current estimate $\varphi_{est,cur}$ of the carrier phase due to the propagation delay. The data fusing particularly comprises a check for plausibility of the own estimated time offset $\tau_{est,prec}$ by means of the received estimated time offset $\tau_{est,prec}$.

In FIG. 3, the current estimate $\varphi_{est,cur}$ of the carrier phase due to the propagation delay is provided by the carrier loop or by the optional external estimator 224 of the propagation delay to the receiver.

At least parts of the above described receiver architecture can also be implemented as steps of a method for receiving spread spectrum signals. The method can be for example implemented as computer program, which performs the steps for processing a received spread spectrum signal as described before with regard to the inventive receiver architecture, when the program is executed by a processor.

In the following receiving and processing of a spread spectrum signal according to the invention is described in detail. Again, the description is proposed when the multiplication with the sub-carrier signal $e^{j(2\pi f_m(t-\tau_{est,prec})+\varphi_m)}$ is performed in the analog domain, but similar derivation and results would be obtained when the multiplication is performed in the digital domain as represented in 116 on FIG. 2. For simplification, in the following equations, it is considered that the time offset $\tau_{est,prec}$ used for synchronization and provided by the code loop or by an external estimator of the propagation delay to the receiver is error free, meaning that $\tau_{est,prec} = \tau$. An error on the synchronization would introduce a slight degradation of the expected theoretical performances.

Considering again the analog receiver architecture option, the expression of the received signal before multiplication with the $e^{j(2\pi f_m(t-\tau_{est,prec})+\varphi_m)}$ is given by:

$$s_{rec}(t) = p(t - \tau) \otimes \sum_{l=1}^{L} a_l \delta(t - lT_c)$$

With p(t) being the pulse shape of the transmitted and received GNSS signal (e.g. a BPSK);

L being the number of code chips during the PRN code period;

Tc being the chip rate of the PRN code; and al being the lth PRN code chip.

t is the time variable $\tau$ is the actual (physical) code delay due to the propagation between the transmitter and the receiver Then, the received signal is multiplied with the sub-carrier signal $e^{j(2\pi f_m(t-\tau_{est,prec})+\varphi_m)}$ used to offset spectrally the received signal during a time interval covering $L_m$ chips, the resulting offset signal expression is given by:

$$s_{rec,m}(t) = p(t - \tau) \times e^{j(2\pi f_m(t-\tau_{est,prec})+\varphi_m)} \otimes \sum_{l=1}^{L_m} a_l \delta(t - lT_c)$$

With $\tau_{est,prec}$ is an estimate of the actual code delay, $\tau$, and derived from the past outputs of the Code and/or Carrier loops embedded in the receiver, or by an external estimator of the propagation delay to the receiver.

The multiplications with the sub-carriers $e^{j(2\pi f_m(t-\tau_{est,prec})+\varphi_m)}$ is performed over different time intervals covering $L_m$ chips, and the resulting signal is the time-aggregate of the elementary $s_{rec,m}(t)$ signals. It should be noted again that in the proposed exemplary embodiment, the sum of the M intervals covering each $L_m$ chips equals P which is also equal to the spreading code period L.

Then the digitized signal at the output of the ADC 110 and at the input of the digital part can be expressed as following when $L_m$ expressed in chips covers a constant fraction (1/M) of the spreading code period duration:

$$s_{input}(t) = \sum_{m=1}^{M} p(t-\tau)e^{j(2\pi f_m(t-\tau_{est,prec})+\varphi_m)} \otimes \sum_{k=\frac{(m-1)\times L}{M}+1}^{\frac{m\times L}{M}} a_k \delta(t-kT_c)$$

With:
M being the number of sub-carrier frequencies fm applied during the period L of the PRN code used for coding the received GNSS signal;
m being the index of the $m^{th}$ sub-code period to which fm is applied;
p(t) being the pulse shape of the transmitted and received GNSS signal;
L being the number of code chips during the PRN code period;
Tc being the chip rate of the PRN code; and
$a_k$ being the $k^{th}$ PRN code.
t is the time variable
In the previous equation, for mathematical simplification, no distortion at payload or receiver level has been considered, neither multipath nor atmospheric effect.

The Cross Correlation Function (CCF) between the digitized signal $s_{input}$ and the reference receiver signal $s_{ref}$ can be expressed as following:

$$CCF(\tau, \tau_{est,cur}) = \frac{1}{T_{int}} \int_0^{T_{int}} s_{input}(t) s_{ref}^*(\tau-\tau_{est,cur}) dt$$

Herein Tint represents the coherent integration time used to generate the CCF and is equal to a duration covering a multiple of P=L chips, namely $T_{int}=K \times P \times T_c$ which is also equal to $K \times L \times T_c$ chips in the proposed exemplary embodiment, and where K is an integer corresponding to the number of frequency offsetting cycles covered by the coherent integration Tint. In the following exemplary embodiment K is set to 1, but the mathematical developments would yield the same expression when integrating coherently over more than 1 frequency offsetting cycle.

Note that if no distortions on the signal are considered, the CCF and Auto Correlation Function (ACF) are equivalent. Therefore both ACF and CCF will be used equivalently in the following description.

Furthermore, $\tau_{est,cur}$ represents the current estimation of the code delay due to the propagation between the transmitter and the receiver. It must be noted that $\tau_{est,cur}$ has the same meaning as in a conventional receiver where the reference signal $s_{ref}$ which is also called replica, is shifted according to $\tau_{est,cur}$.

The reference receiver signal $s_{ref}$, including the shift $\tau_{est,cur}$ applied during correlation, is equal to:

$$s_{ref}(t) = \sum_{m=1}^{M} p(t-\tau_{est,cur})e^{j(2\pi f_m(t-\tau_{est,cur})+\varphi_m)} \otimes \sum_{k=\frac{(m-1)\times L}{M}+1}^{\frac{m\times L}{M}} a_k \delta(t-kT_c)$$

The CCF can be expressed easily by:

$$CCF(\tau) = \left(\frac{1}{M}\sum_{m=1}^{M} e^{j2\pi f_m(\Delta^* \tau)}\right) \cdot CCF_p(\Delta\tau)$$

With:
$CCF_p(\Delta\tau)$ being the CCF of the pulse shape p, like for instance a BSPK.
In the case of a BPSK, $CCF_{BPSK}(\Delta\tau)$ is equal to:

$$CCF_{BPSK}(\Delta\tau) = \begin{cases} 1-|\Delta\tau|, & |\Delta\tau| \leq T_c \\ 0, & \text{else} \end{cases}$$

Where $\Delta\tau$ represents the tracking error for the code delay:

$$\Delta\tau = \tau - \tau_{est,cur}$$

Furthermore, $\Delta^*\tau = \tau_{est,prec} - \tau_{est,cur}$. If one considers that $\tau_{est,prec}$ is evaluated with the past information provided by the code and carrier loops or by an external estimator of the propagation delay to the receiver such like an inertial, a dead reckoning or an odometer system, all information eventually fed into a Kalman Filter, then $\tau_{est,prec}$ is close or identical to t, leading to $\Delta^*\tau = \Delta\tau$. In that case, the CCF can be expressed easily by:

$$CCF_{BOC}(\tau) = \left(\frac{1}{M}\sum_{m=1}^{M} e^{j2\pi f_m(\Delta\tau)}\right) \cdot CCF_p(\Delta\tau)$$

Which is identical to the CCF of a signal using a BOC pulse shape, in case the pulse shape p is a BPSK.

Figure 4:
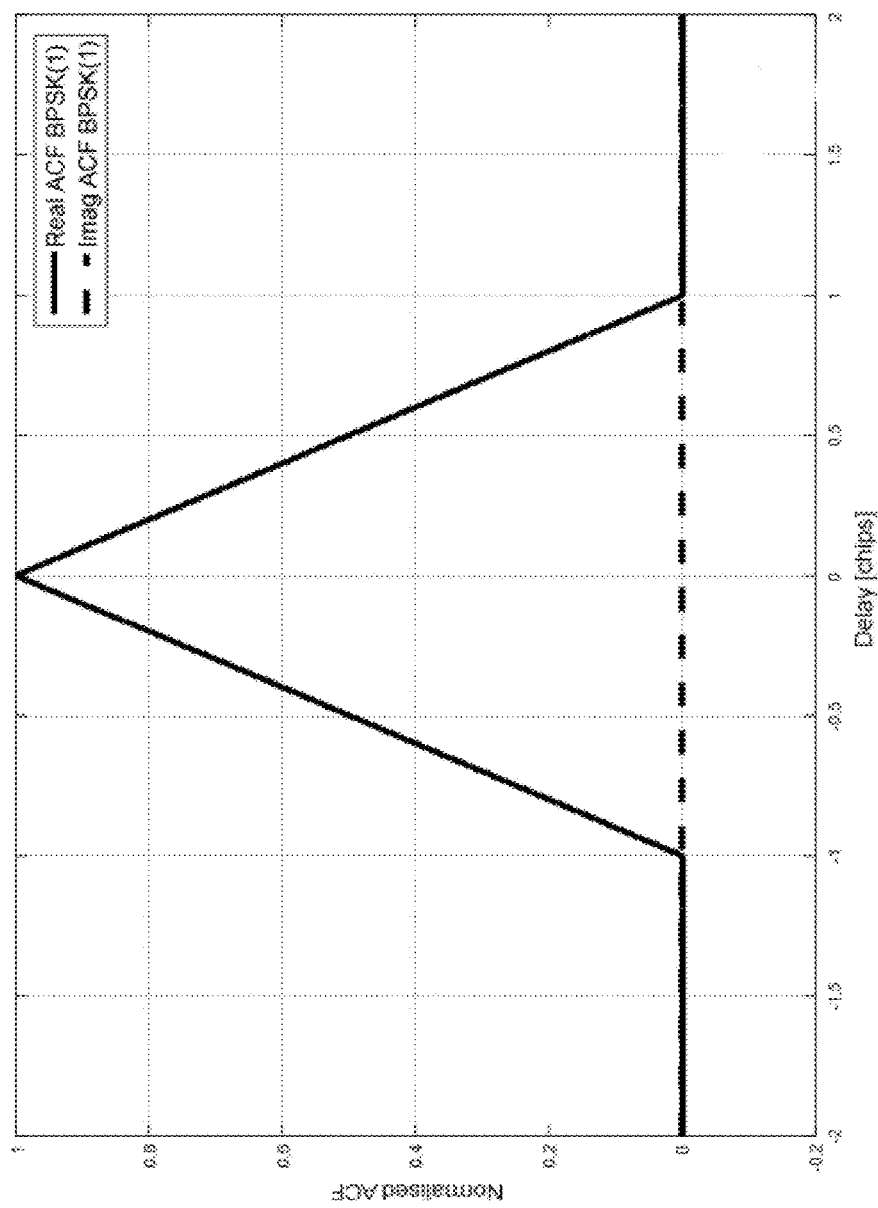
FIG. 4 shows a plot of the ACF of the BPSK modulated signal, and more exactly a BPSK(1) which means that the chip rate is 1 MChip/s.

As an example, the ACF of a received BPSK GNSS signal BPSK(1) is shown in FIG. 4.

By using the inventive receiver architecture, the CCF is the product of the CCF of the pulse shape CCFp which serves as envelop of the CCF and the modulation term:

$$\left(\frac{1}{M}\sum_{m=1}^{M} e^{j2\pi f_m(\Delta^*\tau)}\right).$$

This term is distortion independent; the shaping is the same for an ACF or for a CCF considering the signal distortions. The technique can also be applied to a distorted signal.

Another embodiment of the proposed invention considers the extreme case when each sub-carrier frequency is applied during a single chip and therefore $L_m$ equals one chip for all sub-carrier frequencies fm. M sub-carrier frequencies will therefore cover P=M chips, which does not have to be equal to the number of chips within an entire spreading code period, L, but can be smaller or larger than L. For example, only two frequencies (P=M=2), f1 and f2 can be considered and can be alternated every chip ($L_m$=1). Herein, the digitized signal at the output of the ADC 110 and at the input of the digital part can be expressed as following when Lm covers only one chip:

$$s_{input}(t) = \sum_{m=1}^{M} p(t-\tau)e^{j(2\pi f_m(t-\tau_{est,prec})+\varphi_m)} \otimes a_m \delta(t-mT_c)$$

With:

M being the number of sub-carrier frequencies $f_m$;

m being the index of the $m^{th}$ code chip to which $f_m$ is applied;

p(t) being the pulse shape of the transmitted and received GNSS signal;

Tc being the chip rate of the PRN code; and am being the $m^{th}$ PRN code.

t is the time variable

Here again, in the previous equation, for mathematical simplification, no distortion at payload or receiver level has been considered, neither multipath nor atmospheric effect.

The Cross Correlation Function (CCF) between the digitized signal ($s_{input}$ and the reference receiver signal $s_{ref}$ can be expressed as following:

$$CCF(\tau, \tau_{est,cur}) = \frac{1}{T_{int}} \int_0^{T_{int}} s_{input}(t) s_{ref}^*(t-\tau_{est,cur}) dt$$

Herein Tint represents the coherent integration time used to generate CCF and is equal to a duration covering several elementary durations of P=M=2 chips, namely $T_{int}$=K×M×$T_c$=K×P×$T_c$ and where K is an integer corresponding to the number of frequency offsetting cycles of M chips covered by the coherent integration $T_{int}$. In the following exemplary embodiment K is set to 1, but the mathematical developments would yield the same expression when integrating coherently over more than 1 frequency offsetting cycle. In practice, K should be set to a larger value than 1 because for K=1 the coherent integration time would probably be not long enough to ensure good performances.

Note that if no distortions on the signal are considered, the CCF and Auto Correlation Function (ACF) are equivalent. Therefore both ACF and CCF will be used equivalently in the following description.

Furthermore, $\tau_{est,cur}$ represents the current estimation of the code delay due to the propagation between the transmitter and the receiver. It must be noted that $\tau_{est,cur}$ has the same meaning as in a conventional receiver where the reference signal $s_{ref}$ which is also called replica, is shifted according to $\tau_{est,cur}$.

The reference receiver signal $s_{ref}$, including the shift $\tau_{est,cur}$ applied during correlation, is equal to:

$$s_{ref}(t) = \sum_{m=1}^{M} p(t-\tau_{est,cur})e^{j(2\pi f_m(t-\tau_{est,cur})+\varphi_m)} \otimes a_m \delta(t-mT_c)$$

Calculation of the Cross Correlation Function (CCF) for this example application is the same as described with regards to the previous example application but now when $L_m$ represents one chip for all sub-carrier frequencies fm.

It must be highlighted that the proposed applications of the invention can be extended to other cases where $L_m$ covers more than a single chip, but the sum of the M $L_m$ does not cover exactly one spreading code period, meaning $$P = \sum_{m=1}^{M} L_m \neq L.$$

This could be the case when $L_m$ covers for example 4 chips, and M equal 4 sub-carrier frequencies, letting P=16, while the spreading code period, L, encompasses more than 16 chips.

As an example, a GPS L1CA code signal (BPSK(1)) is received when considering 2 sub-carrier frequencies (M=2) during the PRN code period, L, with 1023 code chips (corresponding to the Gold Code sequences used to generate the GPS L1 CA signals), and when the number of chips to which frequency $f_1$ and $f_2$ alternates from code period to code period in order to have an identical number of chips with frequency $f_1$ and chips with frequency $f_2$ over two successive GPS CA code periods covering 2046 chips. Here one cycle C covers P=L=1023 chips. It means that the set $\{L_m\}_{1 \leq m \leq 2, C}$ per cycle C will differ from cycle to cycle as demonstrated hereafter.

$f_1$=1.023 MHz is applied during 512 chips over a code period, and is applied during 511 chips over the following code period, yielding the first set $\{L_1=512, L_2=511\}_{1 \leq m \leq 2, C1}$ applicable during the first cycle $C_1$.

$f_2$=−1.023 MHz is applied during 511 chips over a code period, and is applied during 512 chips over the following code period, yielding the second set $\{L_1=511, L_2=512\}_{1 \leq m \leq 2, C2}$ applicable during the second cycle $C_2$.

Figure 5:
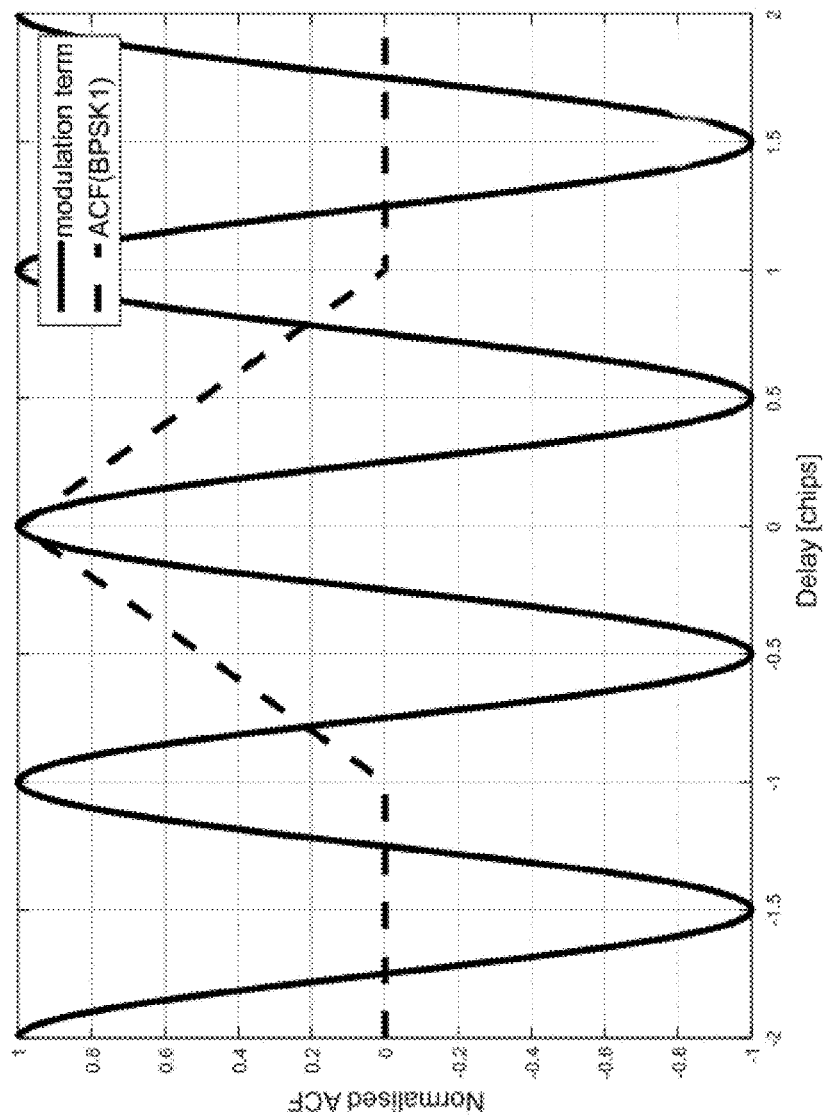
FIG. 5 shows a plot of the ACF and the modulation terms applied to the BPSK signal BPSK(1)

The BPSK(1) ACF as well as the modulation terms are shown in FIG. 5.

Figure 6:
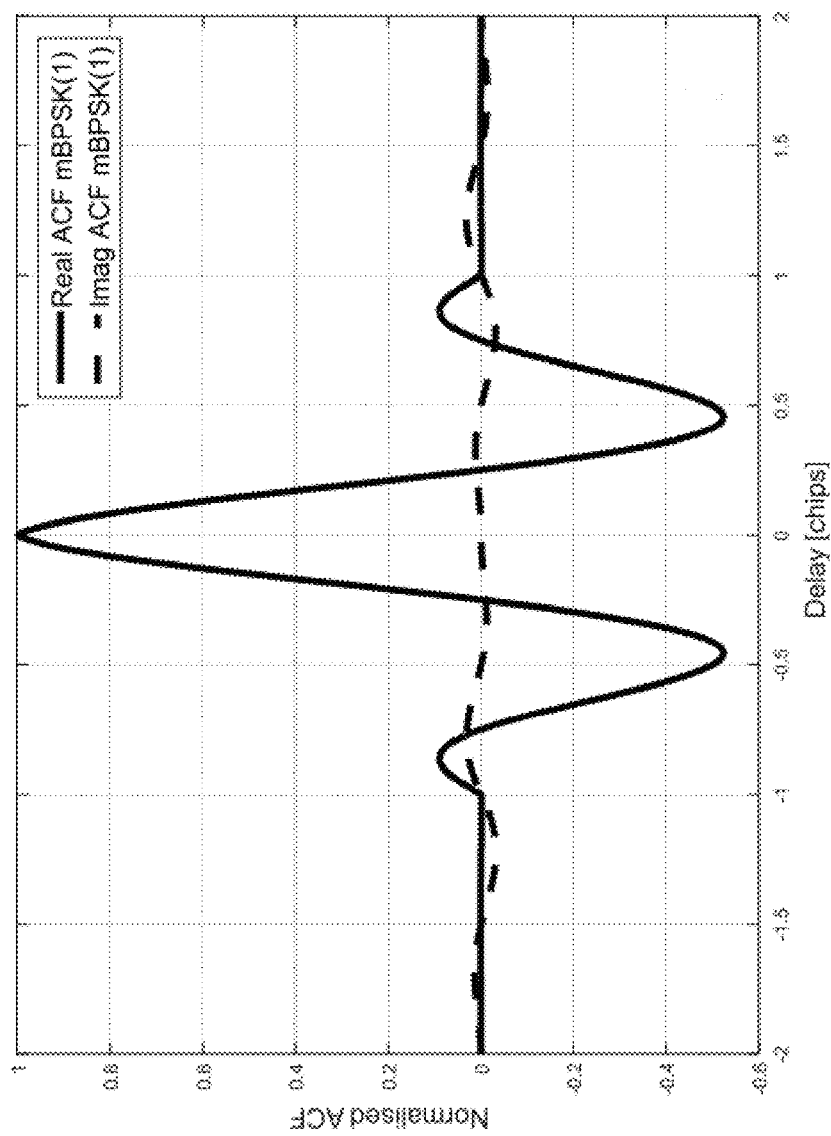
FIG. 6 shows a plot of the multiplication of the ACF and the modulation terms of the BPSK signal BPSK(1)
Figure 7:
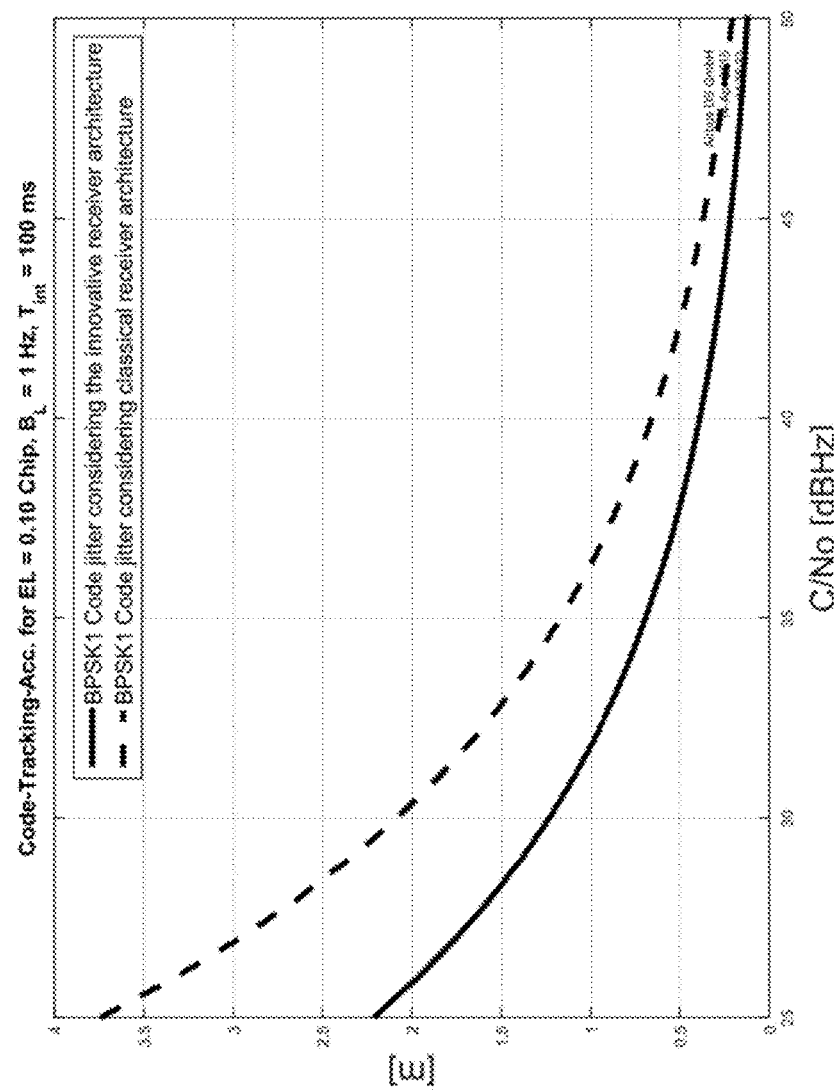
FIG. 7 shows a plot of the code tracking accuracy of a conventional receiver architecture and of the innovative receiver architecture according to the invention, in both cases when receiving a BPSK(1) signal.

The multiplication of the BPSK(1) ACF and modulation term leads to the ACF of the modulated BPSK signal mBPSK(1) visible on FIG. 6.

In order to compare the performance tracking results in AWGN (Additive White Gaussian Noise), code jitter has been evaluated for the inventive receiver architecture and for a conventional receiver architecture. The code discriminator is a non-coherent early minus late receiver, a loop filter of order 1 with a bandwidth of 1 Hz and an integration time of 100 milliseconds and an Early Late spacing of 0.1 chip.

Figure 8:
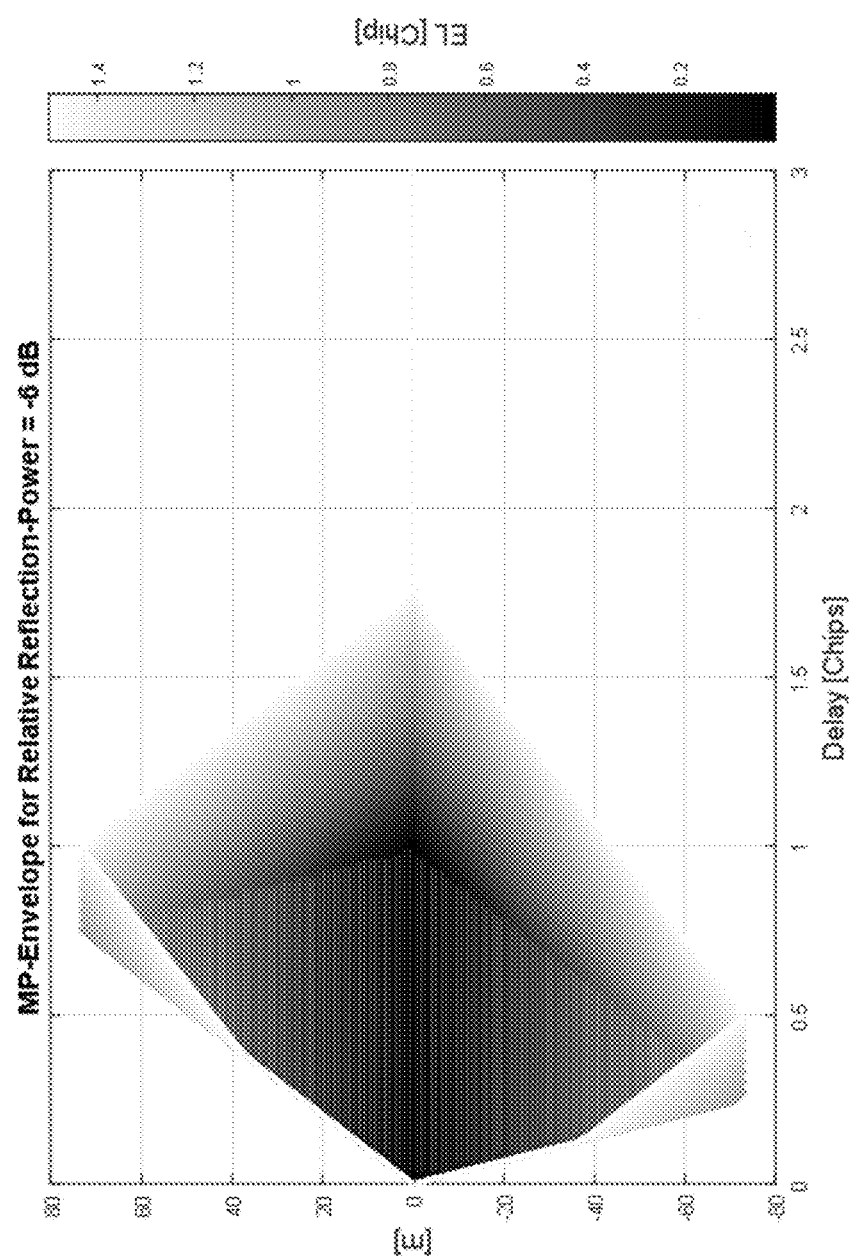
FIG. 8 shows a plot of the MP envelope of a BPSK CDMA signal of a conventional receiver architecture.
Figure 9:
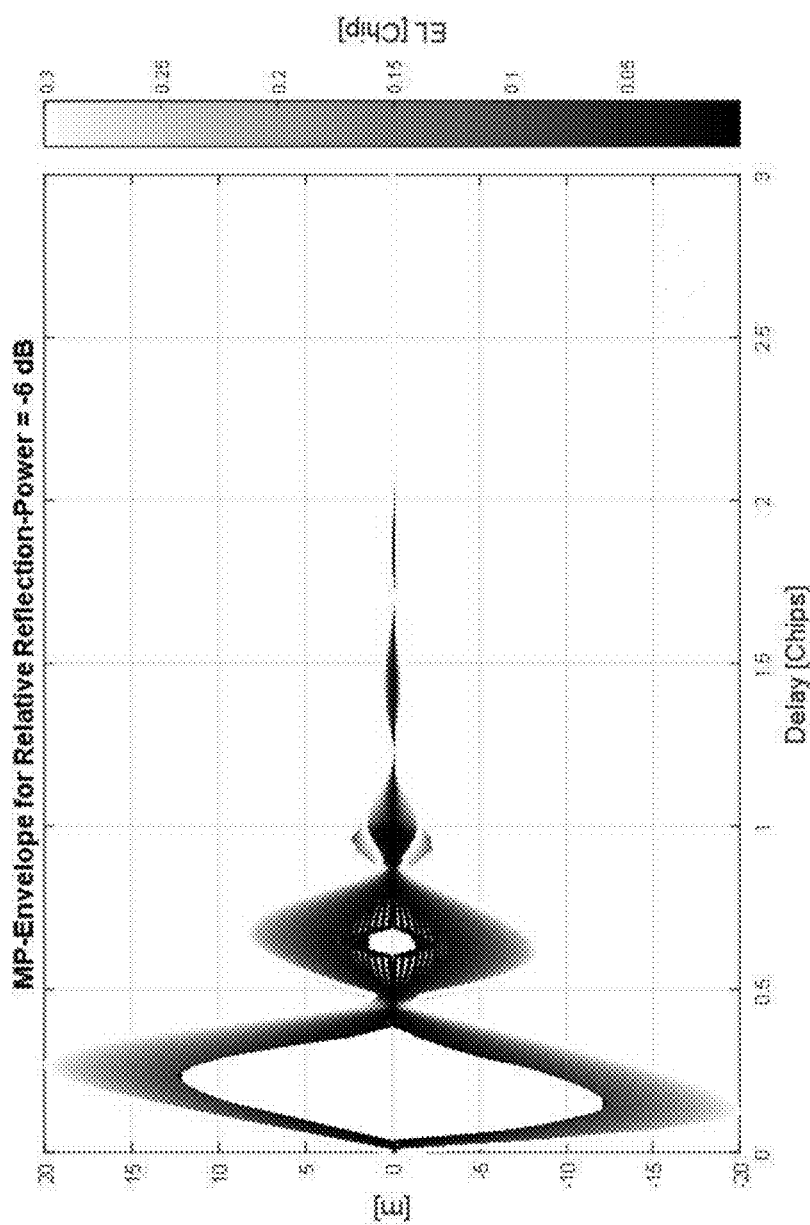
FIG. 9 shows a plot of the MP envelope of a BPSK(1) signal of the innovative receiver architecture according to the invention.

The multipath robustness comparison is shown through the multipath envelope: FIG. 8 the envelope of the conventional receiver architecture, FIG. 9 shows the envelope of the inventive receiver architecture.

It is must be noted that the same results would be obtained either if the frequency $f_1$ would be applied during the first 512 chips of the first code period and to the first 511 chips of the second period, and the frequency $f_2$ would be applied during the last 511 chips of the first code period and to the last 512 chips of the second period when the coherent integration time Tint would be computed with K=2, or if the frequencies $f_1$ and $f_2$ would alternate between consecutive chips (P=M=2 chips), as for example when $f_1$ would be applied to the even chips and $f_2$ to the odd chips, and when the coherent integration time $T_{int}$ would be computed with K=1023.

As shown in the previous examples, the proposed inventive technique and related receiver architecture implementation leads to much better code jitter performance in AWGN and much more robust against multipath.

If Γ(f) denotes the PSD of the processing signal within one coherent integration (i.e. over the correlation time equal to the PRN code period), then the Gabor bandwidth is defined as (here (Rx denotes the two-sided receiver bandwidth):

$$BW_{Gabor} = \int_{-\beta_{rx}/2}^{\beta_{rx}/2} (\Gamma(f))^2 df$$

It is proven that the code tracking performances and the multipath robustness performances are inversely proportional to the Gabor bandwidth. By using the proposed inventive technique BWGabor is synthetically increased, at receiver side, and this results in improved receiver performances.

The improvement can even be better by choosing higher sub-carrier frequency, but the receiver sampling rate has to be updated accordingly (at least 2×max($f_m$) plus the width of spectral occupancy, i.e. PSD, of the original pulse shape, for example the BPSK(1)).

The invention allows reaching a major tracking performance improvement. This improvement can be reached without modifying the transmitted signal. Furthermore, when applying the multiplication with the sub-carrier in the digital domain, the required minimal bandwidth of the front end can be reduced to a minimum corresponding to the width of the original PSD for the pulse shape, such like a BPSK, and this represents an advantage in term of interference robustness. The methodology can be applied to any type of pulse shape.

At least some of the functionalities of the invention may be performed by hard- or software. In case of an implementation in software, a single or multiple standard microprocessors or microcontrollers may be used to process a single or multiple algorithms implementing the invention. In case of an implementation in hardware, a FPGA (Field Programmable Gate Array) or ASIC (Application Specific Integrated Circuit) may be used.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS AND ACRONYMS 10 first part of the receiver
11 first part of the receiver
100 antenna
102 band-pass filter
104 amplifier
106 multiplier
108 pre-processing unit
110 ADC
112 frequency generator
114 analog LO
116 digital LO
20 second part of the receiver
200 multiplier
202 correlate, integrate and dump unit
204 code discriminator
206 code loop filter
208 code NCO
210 code and pulse generator
212 multiplier
214 carrier discriminator
216 carrier loop filter
218 carrier NCO
220 second digital spectral offsetting signal generator
222 $\tau_{est,prec}$ generator for the time offset $\tau_{est,prec}$ used for synchronization
224 optional external estimator for the time offset $\tau_{est,prec}$ used for synchronization
ACF Auto Correlation Function
ADC Analog Digital Converter
AGC Automatic Gain Control
ASIC Application Specific Integrated Circuit
AWGN Additive White Gaussian Noise
BPF Band Pass Filter
BPSK Binary Phase Shift Keying
BOC Binary Offset Carrier Modulation
CF Correlation Function
CCF Cross Correlation Function
CDMA Code Division Multiple Access
DSSS Direct Sequence Spread Spectrum
FPGA Field Programmable Gate Array
GNSS Global Navigation Satellite System
GPS Global Positioning System
LO Local Oscillator
MP Multipath
NCO Numerical Controlled Oscillator
PRN Pseudo-Random Noise
PSD Power Spectral Density

The invention claimed is:

1. A receiver for spread spectrum signals comprising a first part configured to preprocess and digitize a received spread spectrum signal, and a second part configured to track the digitized received spread spectrum signal and comprising a carrier loop and a code loop, wherein the code loop comprises a generator for a reference receiver signal for correlation with the received spread spectrum signal and the code loop is configured to modify the reference receiver signal in order to shape a correlation function between the received spread spectrum signal and the reference receiver signal, wherein one of the first part is adapted for multiplying the received spread spectrum signal with a first analog spectral offsetting signal provided for down-converting the received spread spectrum signal to an intermediate frequency IF0 and a sub-carrier frequency $f_m$ selected from a set of M sub-carrier frequencies such that the received spread spectrum signal is down-converted and spectrally offset in the analog domain during a time interval covering $L_m$ chips, wherein $L_m$ chips comprises at least one chip of a spreading code of the received spread spectrum signal, or the first part is adapted for multiplying the received spread spectrum signal with a second analog spectral offsetting signal provided for down-converting the received spread spectrum signal to an intermediate frequency $IF_0$ in the analog domain, for digitizing the down-converted received spread-spectrum signal, and for multiplying the digitized and down-converted received spread spectrum signal with a digital spectral offsetting signal provided for spectrally offsetting the digitized and down-converted received spread spectrum signal in the digital domain to a sub-carrier frequency $f_m$ selected from a set of M sub-carrier frequencies such that the digitized and down-converted received spread spectrum signal is spectrally offset in the digital domain during a time interval covering $L_m$ chips, wherein $L_m$ chips comprises at least one chip of a spreading code of the received spread spectrum signal.

2. The receiver of claim 1, wherein several spectral offsettings in the analog domain or in the digital domain are performed with different sub-carrier frequencies, $f_m$, and/or the time interval covering $L_m$ chips varies from cycle to cycle of a frequency offsetting cycle C covering M sub-carrier frequencies $\{f_m\}_{1 \leq m \leq M, C}$.

3. The receiver of claim 1, wherein the first analog spectral offsetting signal is defined by $e^{j(2\pi(f_{RF}+IF_0+f_m)(t-\tau_{est,prec})+\varphi_m)}$, and the second analog spectral offsetting signal is defined by $e^{j(2\pi(f_{RF}+IF_0)(t-\tau_{est,prec}))}$ and the digital spectral offsetting signal is defined by $e^{j(2\pi(f_m)(t-\tau_{est,prec})+\varphi_m)}$ with t being a time variable, $f_m$ being a sub-carrier frequency selected from the set of M sub-carrier frequencies and applied during a time interval covering $L_m$ chips, $\tau_{est,prec}$ being a time offset, which is used for synchronization and depends on the actual propagation delay $\tau$ of the transmitted signal up to the receiver and is estimated in a $\tau_{est,prec}$ generator from at least one of the past outputs of the code loop and/or the carrier loop of the receiver, and/or is estimated by an external estimator of the propagation delay to the receiver and processed by the $\tau_{est,prec}$ generator, and $\varphi m$ being a phase which ensures that the argument of the exponential term is continuous at a transition between two consecutive time intervals corresponding to two sub-carrier frequencies $f_m$ and $f_{m+1}$.

4. The receiver of claim 1, wherein the first part comprises a local oscillator, an analog digital converter and either a frequency generator configured for synthesizing frequency references for the local oscillator for down-converting the received spread spectrum signal to the intermediate frequency $IF_0$ and the sub-carrier frequency $f_m$ and for the analog digital converter for digitizing the down-converted received spread spectrum signal, or a frequency generator configured for synthesizing frequency references for the local oscillator for down-converting the received spread spectrum signal to the intermediate frequency $IF_0$ and for the analog digital converter for digitizing the down-converted received spread spectrum signal and an additional digital local oscillator to spectrally offset the down-converted digital spread spectrum signal to the sub-carrier frequency $f_m$.

5. The receiver of claim 1, wherein the first part comprises a pre-processing unit for pre-processing the received spread spectrum signal before digitizing, wherein the pre-processing unit comprises filtering and an automatic gain control of the received spread spectrum signal.

6. The receiver of claim 1 being configured to receive as spread spectrum signal a signal with any pulse shape type such that the combination of the reference receiver signal multiplied with the offsetting signal can be replaced with a Binary Offset carrier (BOC) (K,N) reference receiver signal if the set of M sub-carrier frequencies contains only 2 frequencies $+f_K$ and $-f_K$ and the duration of the time intervals when $+f_k$ is applied is identical to the duration of the time intervals when $-f_k$ is applied.

7. The receiver of claim 6, wherein the receiver is configured to receive as spread spectrum signal a Binary-Phase-Shift-Keying—BPSK(N)—modulated spread spectrum signal.

8. A device for positioning using spread spectrum signals transmitted by a Global Navigation Satellite System, the device comprising a receiver of claim 1 for receiving the spread spectrum signals.

9. A method for receiving spread spectrum signals comprising the following steps:

preprocessing and digitizing a received spread spectrum signal, tracking the digitized received spread spectrum signal by means of a carrier loop and a code loop, wherein the tracking comprises generating a reference receiver signal for correlation with the received spread spectrum signal in the code loop and shaping a correlation function between the received spread spectrum signal and the reference receiver signal by modifying the reference receiver signal in the code loop, wherein one of the received spread spectrum signal is multiplied with a first analog spectral offsetting signal provided for down-converting the received spread spectrum signal to an intermediate frequency $IF_0$ and a sub-carrier frequency $f_m$ selected from a set of M sub-carrier frequencies such that the received spread spectrum signal is down-converted and spectrally offset in the analog domain during a time interval covering $L_m$ chips, wherein $L_m$ chips comprises at least one chip of a spreading code of the received spread spectrum signal, or the received spread spectrum signal is multiplied with a second analog spectral offsetting signal provided for down-converting the received spread spectrum signal to an intermediate frequency $IF_0$ in the analog domain, for digitizing the down-converted received spread-spectrum signal, and for multiplying the digitized and down-converted received spread spectrum signal with a digital spectral offsetting signal provided for spectrally offsetting the digitized and down-converted received spread spectrum signal in the digital domain to a sub-carrier frequency $f_m$ selected from a set of M sub-carrier frequencies such that the digitized and down-converted received spread spectrum signal is spectrally offset in the digital domain during a time interval covering $L_m$ chips, wherein $L_m$ chips comprises at least one chip of a spreading code of the received spread spectrum signal;

wherein the first analog spectral offsetting signal is defined by $e^{j(2\pi(f_{RF}+IF_0+f_m)(t-\tau_{est,prec})+\varphi_m)}$, and the second analog spectral offsetting signal is defined by $e^{j(2\pi(f_{RF}+IF_0)(t-\tau_{est,prec}))}$ and the digital spectral offsetting signal is defined by $e^{j(2\pi(f_m)(t-\tau_{est,prec})+\varphi_m)}$ with t being a time variable, $f_m$ being a sub-carrier frequency selected from the set of M sub-carrier frequencies and applied during a time interval covering $L_m$ chips, $\tau_{est,prec}$ being a time offset, which is used for synchronization and is a function of the actual propagation delay $\tau$ of the transmitted signal up to the receiver and is estimated in a $\tau_{est,prec}$ generator from at least one of the past outputs of the code loop and/or carrier loop of the receiver, and/or is estimated by an external estimator of the propagation delay to the receiver and processed by the $\tau_{est,prec}$ generator, and φm being a phase which ensures that the argument of the exponential term is continuous at a transition between two consecutive sub-carrier frequencies $f_m$ and $f_{m+1}$.

10. The method of claim 9, wherein several spectral offsettings in the analog domain or in the digital domain are performed with different sub-carrier frequencies, $f_m$, and/or the time interval covering $L_m$ chips varies from cycle to cycle of a frequency offsetting cycle C covering M sub-carrier frequencies $\{f_m\}_{1 \leq m \leq M,C}$.

11. The method of claim 9, wherein the step of preprocessing comprises filtering and an automatic gain control of the received spread spectrum signal.

12. A method for receiving spread spectrum signals comprising the following steps:

preprocessing and digitizing a received spread spectrum signal, tracking the digitized received spread spectrum signal by means of a carrier loop and a code loop, wherein the tracking comprises generating a reference receiver signal for correlation with the received spread spectrum signal in the code loop and shaping a correlation function between the received spread spectrum signal and the reference receiver signal by modifying the reference receiver signal in the code loop, wherein one of the received spread spectrum signal is multiplied with a first analog spectral offsetting signal provided for down-converting the received spread spectrum signal to an intermediate frequency $IF_0$ and a sub-carrier frequency $f_m$ selected from a set of M sub-carrier frequencies such that the received spread spectrum signal is down-converted and spectrally offset in the analog domain during a time interval covering $L_m$ chips, wherein $L_m$ chips comprises at least one chip of a spreading code of the received spread spectrum signal, or the received spread spectrum signal is multiplied with a second analog spectral offsetting signal provided for down-converting the received spread spectrum signal to an intermediate frequency $IF_0$ in the analog domain, for digitizing the down-converted received spread-spectrum signal, and for multiplying the digitized and down-converted received spread spectrum signal with a digital spectral offsetting signal provided for spectrally offsetting the digitized and down-converted received spread spectrum signal in the digital domain to a sub-carrier frequency $f_m$ selected from a set of M sub-carrier frequencies such that the digitized and down-converted received spread spectrum signal is spectrally offset in the digital domain during a time interval covering $L_m$ chips, wherein $L_m$ chips comprises at least one chip of a spreading code of the received spread spectrum signal, wherein the steps of down-converting and digitizing of the received spread spectrum signal comprises either the synthesizing of frequency references for down-converting the received spread spectrum signal to the intermediate frequency $IF_0$ and the sub-carrier frequency $f_m$ and for digitizing the down-converted received spread spectrum signal, or the synthesizing of frequency references for down-converting the received spread spectrum signal to the intermediate frequency $IF_0$ and for digitizing the down-converted received spread spectrum signal and for spectrally offsetting the down-converted digital spread spectrum signal to the sub-carrier frequency fm.

13. The method of claim 12, wherein several spectral offsettings in the analog domain or in the digital domain are performed with different sub-carrier frequencies, $f_m$, and/or the time interval covering $L_m$ chips varies from cycle to cycle of a frequency offsetting cycle C covering M sub-carrier frequencies $\{f_m\}_{1 \leq m \leq M,C}$.

14. The method of claim 12, wherein the step of preprocessing comprises filtering and an automatic gain control of the received spread spectrum signal.

15. A method for receiving spread spectrum signals comprising the following steps:

preprocessing and digitizing a received spread spectrum signal, tracking the digitized received spread spectrum signal by means of a carrier loop and a code loop, wherein the tracking comprises generating a reference receiver signal for correlation with the received spread spectrum signal in the code loop and shaping a correlation function between the received spread spectrum signal and the reference receiver signal by modifying the reference receiver signal in the code loop, wherein one of the received spread spectrum signal is multiplied with a first analog spectral offsetting signal provided for down-converting the received spread spectrum signal to an intermediate frequency $IF_0$ and a sub-carrier frequency $f_m$ selected from a set of M sub-carrier frequencies such that the received spread spectrum signal is down-converted and spectrally offset in the analog domain during a time interval covering $L_m$ chips, wherein $L_m$ chips comprises at least one chip of a spreading code of the received spread spectrum signal, or the received spread spectrum signal is multiplied with a second analog spectral offsetting signal provided for down-converting the received spread spectrum signal to an intermediate frequency $IF_0$ in the analog domain, for digitizing the down-converted received spread-spectrum signal, and for multiplying the digitized and down-converted received spread spectrum signal with a digital spectral offsetting signal provided for spectrally offsetting the digitized and down-converted received spread spectrum signal in the digital domain to a sub-carrier frequency $f_m$ selected from a set of M sub-carrier frequencies such that the digitized and down-converted received spread spectrum signal is spectrally offset in the digital domain during a time interval covering $L_m$ chips, wherein $L_m$ chips comprises at least one chip of a spreading code of the received spread spectrum signal, wherein as spread spectrum signal a signal with any pulse shape type and particularly a Binary-Phase-Shift-Keying—BPSK(N)— modulated spread spectrum signal such that the combination of the reference receiver signal multiplied with the offsetting signal can be replaced with a Binary Offset Carrier (BOC) (K,N) reference receiver signal if the set of M sub-carrier frequencies contains only 2 frequencies $+f_K$ and $-f_K$ and the duration of the time intervals when $+f_k$ is applied is identical to the duration of the time intervals when $-f_k$ is applied, is received.

16. The method of claim 15, wherein several spectral offsettings in the analog domain or in the digital domain are performed with different sub-carrier frequencies, $f_m$, and/or the time interval covering $L_m$ chips varies from cycle to cycle of a frequency offsetting cycle C covering M sub-carrier frequencies $\{f_m\}_{1 \leq m \leq M, C}$.

17. The method of claim 15, wherein the step of preprocessing comprises filtering and an automatic gain control of the received spread spectrum signal.

\* \* \* \* \*